US009424488B2

(12) United States Patent
Simske et al.

(10) Patent No.: US 9,424,488 B2
(45) Date of Patent: Aug. 23, 2016

(54) APPLYING A SEGMENTATION ENGINE TO DIFFERENT MAPPINGS OF A DIGITAL IMAGE

(75) Inventors: Steven J. Simske, Fort Collins, CO (US); Malgorzata M. Sturgill, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2776 days.

(21) Appl. No.: 11/763,317

(22) Filed: Jun. 14, 2007

(65) Prior Publication Data

US 2008/0310715 A1 Dec. 18, 2008

(51) Int. Cl.
  *G06K 9/34* (2006.01)
  *G06K 9/62* (2006.01)
  *G06T 7/00* (2006.01)

(52) U.S. Cl.
  CPC ............ *G06K 9/6221* (2013.01); *G06T 7/0081* (2013.01)

(58) Field of Classification Search
  None
  See application file for complete search history.

(56) References Cited

U.S. PATENT DOCUMENTS

| | | | | |
|---|---|---|---|---|
| 5,671,294 A * | 9/1997 | Rogers | ................... | G06K 9/482 382/108 |
| 6,449,389 B1 * | 9/2002 | Schweid | ................. | G06T 5/008 382/164 |
| 6,728,391 B1 * | 4/2004 | Wu | .......................... | B07C 1/00 209/583 |
| 6,993,185 B2 * | 1/2006 | Guo | ................... | G06K 9/00456 382/164 |
| 7,020,329 B2 * | 3/2006 | Prempraneerach | .. | G06K 9/4652 382/164 |
| 7,035,461 B2 * | 4/2006 | Luo | ..................... | G06K 9/00228 382/164 |
| 7,177,470 B2 * | 2/2007 | Jasinschi | ................ | G11B 27/28 348/E17.004 |
| 2006/0280352 A1 | 12/2006 | Muschler | | |
| 2007/0024915 A1 * | 2/2007 | Simske | .................... | B41M 3/14 358/3.28 |
| 2007/0047813 A1 | 3/2007 | Simske | | |

FOREIGN PATENT DOCUMENTS

EP     1510973 A2    3/2005

OTHER PUBLICATIONS

Strouthopoulos et al., Text Extraction in Complex Color Documents, Pattern Recognition Society, vol. 35, pp. 1743-1758, 2002.*
Wahl, F.M., Wong, K.Y. and Casey, R.G. "Block segmentation and text extraction in mixed/image documents," Computer Vision Graphics and Image Processing, vol. 2, pp. 375-390, 1982.
Shi, J. and Malik, J., "Normalized cuts and image segmentation," IEEE Trans. Pattern Analysis Machine Intelligence, vol. 22, No. 8, pp. 888-905, 2000.
European Search Report, issued Oct. 23, 2014, in related EP application 08768458.5.

(Continued)

*Primary Examiner* — Jayesh A Patel
(74) *Attorney, Agent, or Firm* — Law office of Hugh Gorther

(57) ABSTRACT

An image processing method includes applying a segmentation engine to different mappings of a digital image, and generating primitives by tessellating non-congruent segments of the different mappings, where the primitives are defined by boundaries of the non-congruent segments in the different mappings. The method further includes classifying the primitives. Classifying the primitives is accomplished by assessing, using a plurality of classifiers, a quality of each segment of each mapping, and assigning a classification to each primitive based upon the assessing. Each of applying, generating and classifying is performed by a processor programmed by machine memory encoded with data.

14 Claims, 5 Drawing Sheets

(56) References Cited

OTHER PUBLICATIONS

F Kurugollu et al: "Color image segmentation using histogram multithresholding and fusion", Image and Vision Computing, vol. 19, No. 13, Nov. 1, 2001, pp. 915-928.
Forsyth D A et al: "Computer vision—a modern approach, Segmentation by Clustering", Jan. 1, 2003.
International Search Report and Written Opinion of the International Searching Authority, mailed Jan. 29, 2009, issued in related PCT Application No. PCT[US2008/007427.
Tinku Acharya et al: "Image Processing: Principles and Applications" In: "Image Processing: Principles and Applications", Jan. 1, 2005, XP-55146985A-1 JP May 4, 2016.

* cited by examiner

APPLYING A SEGMENTATION ENGINE TO DIFFERENT MAPPINGS OF A DIGITAL IMAGE

BACKGROUND

Image segmentation involves defining region boundaries of objects in a digital image. Segmentation facilitates tasks such as image understanding (e.g., optical character recognition, repurposing, archiving, copying, creating text-only documents, field extraction/indexing, compression, proofing, and restoration) and machine vision (e.g., security, inspection, validation, detection, object recognition, and tracking).

Accuracy of the segmentation can be reduced by poor image quality. For instance, accuracy of the segmentation can be reduced by variable or poor lighting, noise, low resolution capture, poor optics, poor or variable contrast, shaded or gradient backgrounds, etc. Accuracy of the segmentation can also be reduced by other factors, such as failures due to image size and file format.

DETAILED DESCRIPTION

Figure 1:
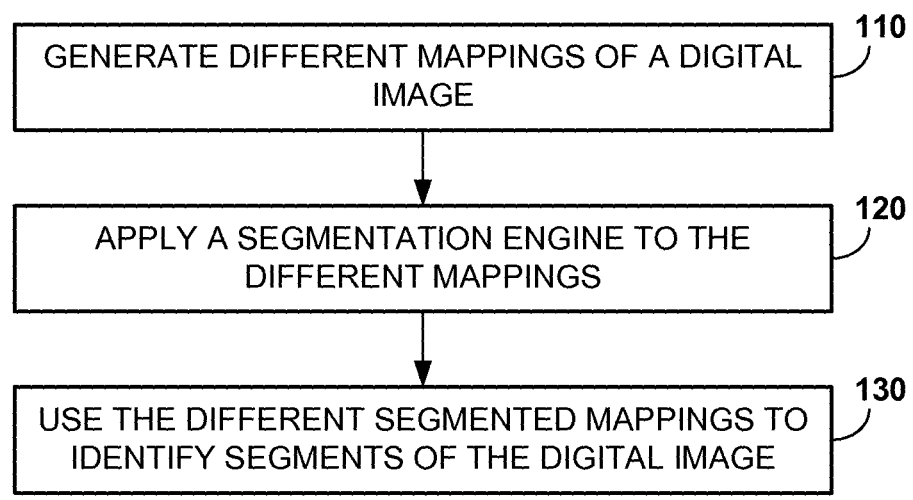
FIG. 1 is an illustration of an image segmentation method in accordance with an embodiment of the present invention.

Reference is made to FIG. 1, which illustrates a method of processing a digital image. The digital image could be color or grayscale.

At block 110, different mappings of the digital image are generated. As used herein, a "mapping" refers to an image that has been transformed to display a certain characteristic. Exemplary mappings may display any of the ten characteristics listed in Table 1. Other exemplary mappings may display, but are not limited to, texture, brightness, color constancy, and any other image characteristic with some segmentation saliency. Each of these mappings can be considered an (at least partially) independent view of the image to be segmented, inasmuch as each mapping displays a different data characterization of the image. The ten characteristics of Table 1 are not totally independent, since (RGB) and (CMY) and (HIS) are inter-computed and contain only three degrees of freedom statistically at the "whole image" level. However, since backgrounds and color palettes can be different in different sections of an image, it is often the case that mappings of each of these ten characteristics will have a different overall segmentation.

TABLE 1

| | |
|---|---|
| R | red channel of a digital image |
| G | Green channel of a digital image |
| B | Blue channel of a digital image |
| C | Cyan channel of a digital image |
| M | Magenta channel of a digital image |
| Y | Yellow channel of a digital image |
| H | Hue of a digital image |
| S | Saturation of a digital image |
| I | Intensity of a digital image |
| PV | Pixel Variance ("edge") space of a digital image |

At block 120, a segmentation engine is applied to each of the different mappings. Resulting are multiple mappings that are segmented. For a color image, the segmentation engine can be applied to two or more mappings of the characteristics listed in Table 1. For a grayscale image, the segmentation engine could be applied to an intensity mapping and an edge mapping. Each mapping may be processed "as if" a grayscale image, or as already thresholded, or as binarized to a 1-bit image.

The segmentation is not limited to any particular engine. Exemplary segmentation engines are described in the following documents: U.S. Pat. No. 5,767,978; Wahl, F. M., Wong, K. Y. and Casey, R. G. "Block segmentation and text extraction in mixed/image documents," Computer Vision Graphics and Image Processing, vol. 2, pp. 375-390, 1982; and Shi, J. and Malik, J., "Normalized cuts and image segmentation," IEEE Trans. Pattern Analysis Machine Intelligence, vol. 22, no. 8, pp. 888-905, 2000.

At block 130, the different segmented mappings are used to identify segments of the digital image. In general, the goal at block 130 is to identify a single set of segments from the segments in the different segmented mappings. This function is performed if the segments in the different mappings are not congruent (that is, if the segmented mappings do not show the same segments).

Figure 2:
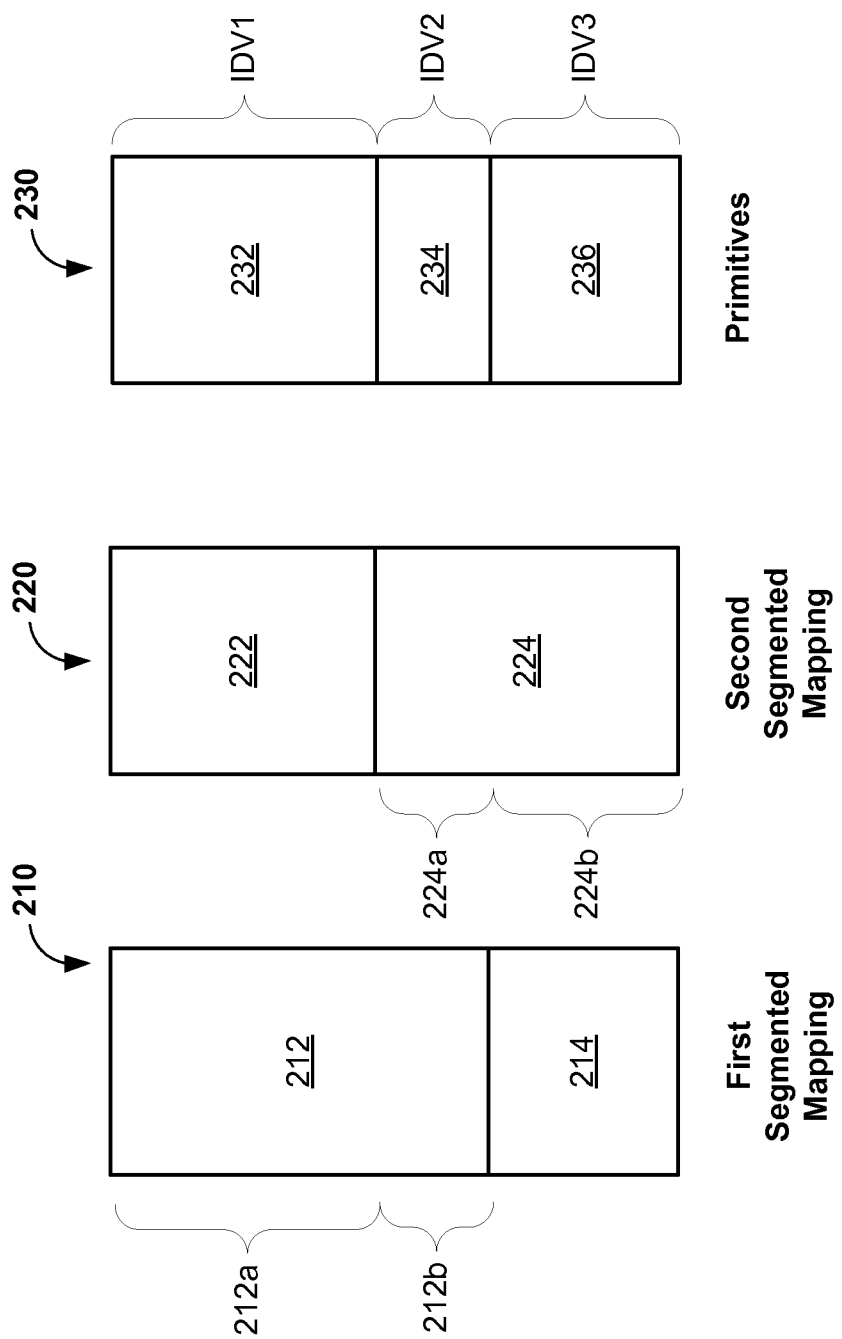
FIG. 2 is an illustration of non-congruent segments in different segmented mappings.

Reference is made to FIG. 2, which illustrates non-congruent segments in different segmented mappings 210 and 220. The first segment 212 of the first mapping 210 is not congruent with the first segment 222 of the second mapping 220. The second segment 214 of the first mapping 210 is not congruent with the second segment 224 of the second mapping 220.

Figure 3:
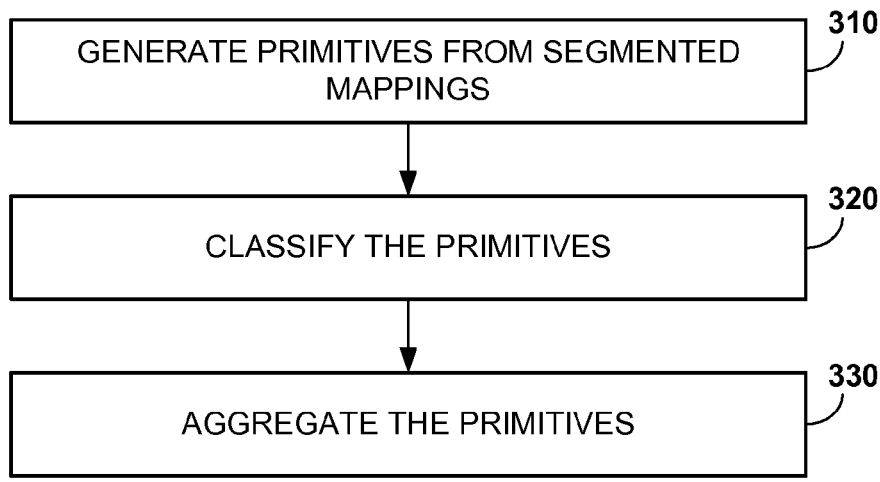
FIG. 3 is an illustration of a method in accordance with an embodiment of the present invention.

Additional reference is made to FIG. 3. At block 310, primitives are generated from the segmented mappings. The primitive generation may be viewed as a union of segment boundaries. For example, the segmented mappings 210 and 220 in FIG. 2 would produce a set 230 of three primitives 232, 234 and 236. Primitive 232 is defined by a first boundary between segments 222 and 224. Primitive 236 is defined by a second boundary between segments 212 and 214. Primitive 234 is defined by the first and second boundaries. Generating the primitives will ensure that distinct segments are not missed.

An identification vector can be assigned to each primitive 232, 234 and 236. The identification vector IDV1 for primitive 232 would contain pixels sets 212*a* and 222, the identification vector IDV2 for primitive 234 would contain pixel sets 212*b* and 224*a*, and the identification vector IDV3 for primitive 236 would contain pixel sets 214 and 224*b*.

At block 320, the primitives are classified. Classification involves typing, such as text, image, business graphic, etc. Classification can involve looking at shape, morphology, color content, etc. Classification can also look at file extension, complexity, layout metrics, other page metrics, source and grouping, etc. Examples of classifications include text regions, photo regions, monochrome drawing regions, color drawing regions, equations, tables, figures, captions, titles, links, video links, etc.

A classification algorithm may be selected and used to classify the primitives. A conventional classification algorithm may be used.

At block 330, aggregation of the primitives is performed. Aggregation includes the clustering of appropriate sets of primitives, if appropriate or demanded. Examples of aggregation include clustering an image and caption as a figure, combining multiple rows of text as a text column, etc.

A conventional zoning engine performs segmentation, classification and aggregation. If a conventional zoning engine is applied to a mapping, it will produce a segmented mapping, and it will classify each segment of the mapping. The conventional zoning engine will also produce statistics regarding the classification. The segmentation information can be used to generate primitives. In addition, the classification information can be used to classify the primitives.

Consider the following problem that could occur if a conventional zoning engine is applied to the different mappings 210 and 220 of FIG. 2. The first segment 212 of the first mapping 210 has a different classification than the first segment 222 of the second mapping 220. Therefore, a decision must be made when assigning a classification to the first primitive 232. Moreover, the second segment 224 of the second mapping 220 has a different classification than the first segment 212 of the first mapping 210, which makes classification of the second primitive 234 even more difficult.

Figure 4:
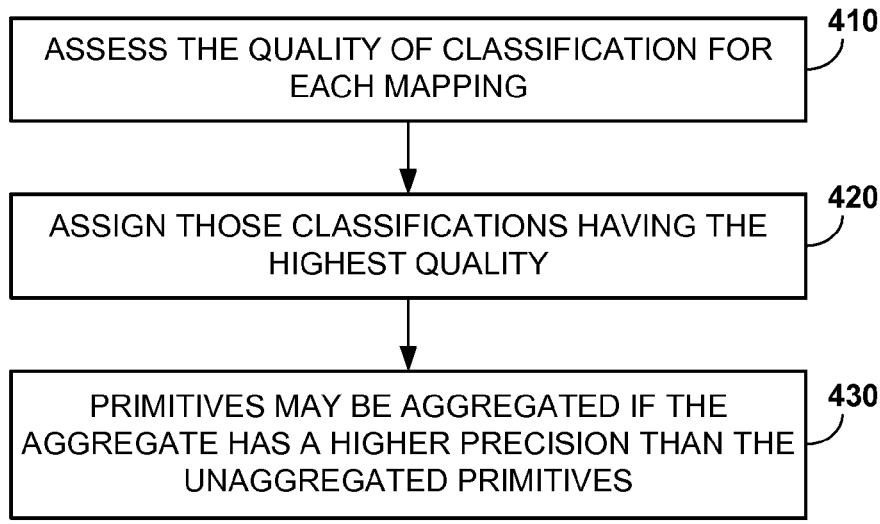
FIG. 4 is an illustration of a method of performing classification and aggregation in accordance with an embodiment of the present invention.

Reference is now made to FIG. 4, which illustrates a method that addresses this problem. The primitives may be classified by assessing the quality of each mapping (block 410), and assigning those classifications having the highest quality (block 420). For example, if the first segment 212 of the first mapping 210 has a higher quality than the first segment 222 of the second mapping 220, then the first primitive 232 will be assigned the same classification as the first segment 212.

Quality of a classification may be based on a confidence level of classifying a mapping. In turn, the confidence level may be based on its precision. Precision refers to the percentage of "right" answers for a given set of answers. The precision of classifying a mapping may be determined by evaluating an engine against a known set of documents that display a certain characteristic (a process known as "ground truthing"). So, for a given zoning engine, one mapping (characteristic) might be more precise for text, another mapping (another characteristic) might be more precise for equations, and another mapping (yet another characteristic) might be more precise for photos.

The quality of a classification may also consider statistics for each mapping. Segmentation engines typically provide normalized statistical vectors (p-values or partial probabilities) for all the possible segment types. The quality of a classification may be the confidence level weighted by the statistics.

Consider the following simple example. A segmentation engine allows only drawing, text, junk, table and photo regions as segment types. When applied to a first mapping of a logo region (small drawing), the segmentation engine provides the following statistics: drawing p-value=0.54; text p-value=0.33; junk p-value=0.10; table p-value=0.02; and photo p-value=0.01. Further to this example, the segmentation engine has a confidence level of 1.0 for this particular mapping. Therefore, the overall (statistical output*confidence value) statistics are also drawing p-value=0.54; text p-value=0.33; junk p-value=0.10; table p-value=0.02; and photo p-value=0.01.

When applied to a second mapping of the logo region, the segmentation engine provides the following statistics: drawing p-value=0.19; text p-value=0.70; junk p-value=0.07; table p-value=0.02; and photo p-value=0.02. The segmentation engine has a confidence level of 0.3 for this particular mapping. Therefore, the overall statistics are as follows: p-value=0.06; text p-value=0.21; junk p-value=0.02; table p-value=0.01; and photo p-value=0.01.

The statistics may be combined by adding them together. The quality measure would be drawing p-value=0.60; text p-value=0.54; junk p-value=0.12; table p-value=0.03; and photo p-value=0.02. Based on this quality measure, the segment is classified as a drawing.

The example can be extended to more than two mappings.

The quality measure may be further refined by the use of additional information. Statistics may be further weighted based on their performance on particular document file types (e.g. different statistics for .DOC, .TIFF, and .HTML, or even by the equivalent of file extensions indicating the type of scanner used). Statistics may be further weighted according to various measures of image complexity (e.g., thresholding, smearing and measuring the number of segments, mean size of segments, distribution of segments, mean white space around segments, etc.). Statistics may be further weighted as a function of layout metrics, such as (a) percent foreground segments, percent solid segments and percent nonsolid segments; (b) percent text segments, percent non-text segments and distribution of the segments from the center (to prevent mistyping due to upside down and/or landscape orientations); (c) segment-relative layout signature; and (d) segment-absolute layout signature. Statistics may be further weighted as a function of source, grouping, purpose, etc. For example, all files from a certain company are categorized together; files sharing the same layout templates are categorized together; files intended for certain applications are categorized together, etc.

Primitives may be aggregated if the aggregate has a higher precision than the unaggregated primitives (block 430). Precision of the combined (aggregate) region is compared to precision of the unaggregated primitive set. For example, precision of the aggregate is compared to the weighted area (e.g., average precision) of the primitives. If the aggregate has a higher precision, the primitives are aggregated. If the aggregate does not have a higher precision, the primitives are not aggregated.

The precision of aggregation is not limited to any particular measure. Moreover, multiple precision measures may be used. As a first example, the more of a rectangular, non-overlapping layout of the segments (the more "Manhattan"), the better the precision measure. A fully "Manhattan" layout has a convex hull exactly equal to each segment size.

Another measure of precision is best match to a template or pattern. The best match can be determined by comparing the variance in the differential background between different segments.

Figure 5:
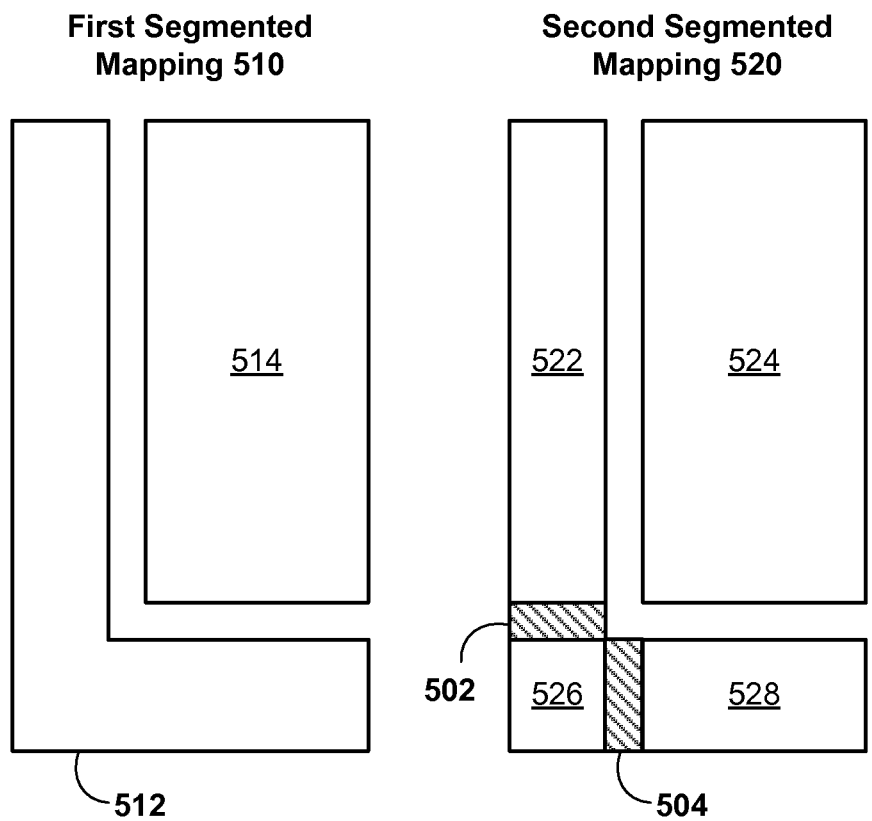
FIG. 5 is an illustration of a precision measure for aggregation in accordance with an embodiment of the present invention.

Reference is now made to FIG. 5, which illustrates an example of the best match precision measure. Cross-hatched areas 502-504 correspond to the differential inclusion of background pixels between the two segments 512-514 in a first segmented mapping 510 and the four segments 522-528 in a second segmented mapping 520. The cross-hatched areas do not contain any text, image, etc., but just "background" of the image (usually white pixels). If the cross-hatched areas 502-504 have a substantially high variance, then they are probably not background areas, and so the first segmented mapping 510 is probably more precise. Otherwise the second mapping 520 is probably more precise. It is also more precise due to its lower convex hull/area ratio of 1.0 as compared to a ratio of ~1.7 for the first segmented mapping 510.

Another precision measure of aggregation utilizes classification statistics. Weighted p-values of non-aggregated sets of primitives are compared to weighted p-values of aggregated primitives. Consider the following example, in which the precision of a table is compared to the weighted precision of two classified primitives. The primitives include are classified as "drawing" for boxed data and "text" for the table header. The table precision is p=0.81 but the drawing precision is p=0.78 and the text (e.g. table header) is p=0.83. If the drawing occupies 90% of the table area, then the weighted precision of drawing+text is 0.78*0.90+0.83*0.10=0.702+ 0.083=0.785, which is less than the 0.81 of the table. Thus, the aggregation (table) is accepted.

Thus disclosed is a method that includes applying a segmentation engine to different mappings. One advantage of using the different mappings is an improvement in accuracy of segmentation and classification. By generating primitives, distinct segments are not missed.

The correct classification can be found even if no single mapping identifies the correct classification. The complementary (that is, at least partially independent) behavior of multiple mappings can create "emergent" classifications (i.e. classifications not present in any of the individual mappings). Consider the example in FIG. 2. Say the first and third identification vectors are processed, and their overall statistics indicate that primitives 232 and 236 are most likely to be text and drawing, respectively. Had the primitives not been generated, the pixels corresponding to primitive 234 might have been classified as either text or drawing. However, the second identification vector is processed, and its overall statistics indicates that primitive 234 is photo. This classification is emergent.

Accuracy may also be increased because the different mappings can also get rid of outliers, which due to poor image quality could distort the segmentation and classification. For instance, a hue mapping may be quite independent of a saturation mapping depending on poor image quality. Complementary mappings also tend to reduce the influence of outliers.

Another advantage is the ability to analyze images from many different devices, different resolutions, etc, even if the devices, different resolutions, and other information is not known. That is, the problem of blind image restoration can be solved simply by using different mappings (e.g. a first mapping of hue, a second mapping of saturation, and a third mapping of intensity) for the different devices, different resolutions, etc. Yet even if the devices, resolutions, and other information is not known, a set of mappings can be selected for the different possibilities.

Yet another advantage is that segmentation and classification can be performed without first having to improve the quality of a digital image (e.g., correct for poor lighting, reduce background noise, etc.). Instead, a predictive selection of the mappings may be performed (e.g., at block 110 in FIG. 1). Some measurable attribute of the image can be used to select the correct mappings. For instance, if poor lighting is suspected, mappings of hue and saturation could be selected. Predictive selection can also be based on historical/training etc. data for the class of images.

Predictive selection can also be based on the image capabilities and quality of the capture device, if known. If the capabilities and quality of the imaging device is known, mappings could be selected accordingly. For example, white and black points of the image can be determined by looking at a histogram of intensity. Suppose a first image has white point of 243 and black point of 13, and a second image has white and black points of 207 and 43. The second image may be predictively assigned to a "slightly underexposed" class, while the first image is assigned to a "well exposed" class. Class-specific weightings based on this image metric could then be applied.

More generally, the predictive selection may be used to address different image issues. These issues include, without limitation, image quality, image understanding, repurposing, matching, classification, authentication, inspection, and quality assurance.

Yet another advantage is that a conventional zoning engine can be utilized to generate, classify, and aggregate the primitives. However, a method according to an embodiment of the present invention is not limited to conventional zoning engines. Segmentation, classification and aggregation engines may be customized.

A method according to an embodiment of the present invention is not limited to classifying primitives based on the classifications of different mappings. For instance, after primitives are generated, the digital image (not a mapping thereof) is segmented to show those primitives. Classification and aggregation of the primitives in the digital image are then performed.

A method according to the present invention is not limited to generating primitives from the different mappings. Consider an example in which segments in the different mappings are essentially congruent (that is, all mappings show essentially the same segments). Such an example might occur in simple documents, where there might be a difference of a few background pixels on the borders of segments, but the segments are essentially the same (e.g. a page is generally classified as "all text" in the different segmented mappings). In this example the generation of primitives can be skipped, and the statistical (combination) classification and aggregation can be performed on each segment.

Consider another example in which segmentation is the same for the different mappings. However, some of the segments are classified differently in the different mappings. Emergent classifications for some of the segments might result.

Segmentation according to an embodiment of the present invention could be included in an image processing pipeline. Classification and aggregation according to an embodiment of the present invention could also be included in an image processing pipeline.

Figure 6:
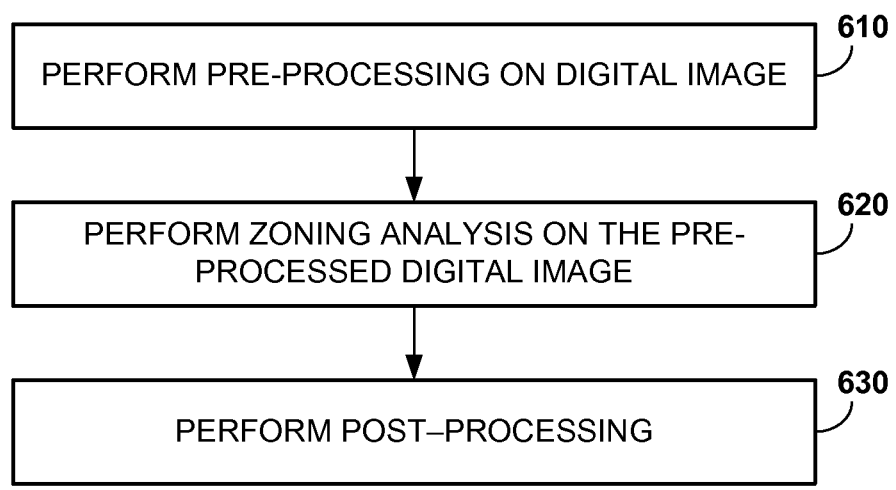
FIG. 6 is an illustration of an image processing method in accordance with an embodiment of the present invention.

Reference is now made to FIG. 6, which illustrates a method of processing a digital image. At block 610, pre-processing may be performed. Pre-processing may include downsampling the digital image (e.g. from 600 ppi to 75 ppi), since full resolution is not generally required for zoning analysis. The pre-processing may also include image restoration (e.g. contrast adjustment, auto-exposure, sharpening, denoising, etc.) if needed, and possibly file conversion. [e.g. from PDF or XML representation to raster—TIFF, BMP, etc.) so the layers are flattened together for zoning.

At block 620, zoning analysis is performed on the pre-processed digital image. The zoning analysis may include segmentation, classification and aggregation. The segmentation includes applying a segmentation engine to different mappings of the digital image.

At block 630, post-processing is performed. The post processing may include any task that makes use of the zoned image.

One exemplary task involves the processing of security "deterrents" (printed areas containing authenticable data). Often, image quality of the deterrent is so variable and the image capabilities and quality of the device that captured the image is often not known. For instance, an inspector takes a picture of a security deterrent (e.g., an anti-counterfeiting pattern on a package) with a cell phone camera. The picture may be taken in poor lighting conditions. The resulting picture can be zoned as described above. The deterrent can be extracted from the segmented image and authenticated. An exemplary method for extracting a deterrent based on certain characteristics (e.g., histogram, color frequency, etc.) is disclosed in assignees U.S. Ser. No. 11/668,670 filed Jan. 30, 2007.

Figure 7:
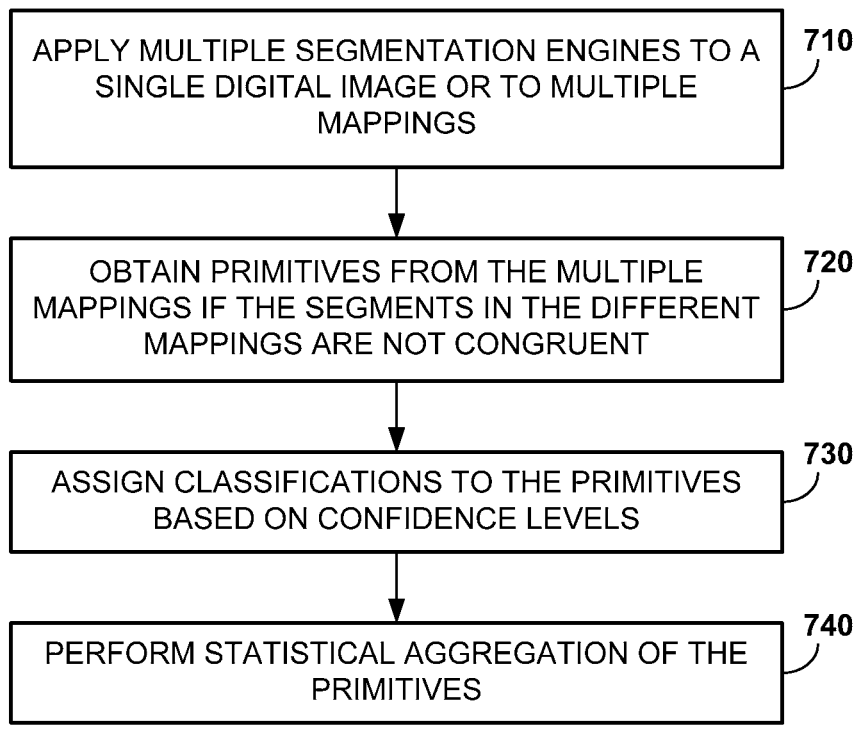
FIG. 7 is an illustration of an image processing method in accordance with an embodiment of the present invention.

Reference is now made to FIG. 7, which illustrates another image processing method. At block 710, multiple segmentation engines are applied to a single digital image or to multiple mappings of the digital image. If multiple mappings are used, the multiple segmentation engines could operate on the same set of mappings, or the engines could operate on different mappings. Resulting are different segmented versions of the digital image.

Given no other constraints, the engines having the highest overall weighting (confidence factor multiplied by mean expected statistical output for regions in documents in this sub-category) could be selected. However, the more engines that are available, the more sophisticated will be the algorithms that select an optimal set. Smaller sets might require optimization of a cost function (e.g. performance cost, accuracy cost, etc.), while larger sets might require clustering and/or other specific selection algorithms to determine the optimal set.

At block 720, primitives are obtained from the multiple mappings if the segments in the different mappings are not congruent. At block 730, classifications are assigned to the primitives based on confidence levels. At block 740, statistical aggregation of the primitives is performed.

One problem with the use of a single segmentation engine is that the engine might not work on a certain file format. The use of multiple segmentation engines can overcome this problem.

Figure 8:
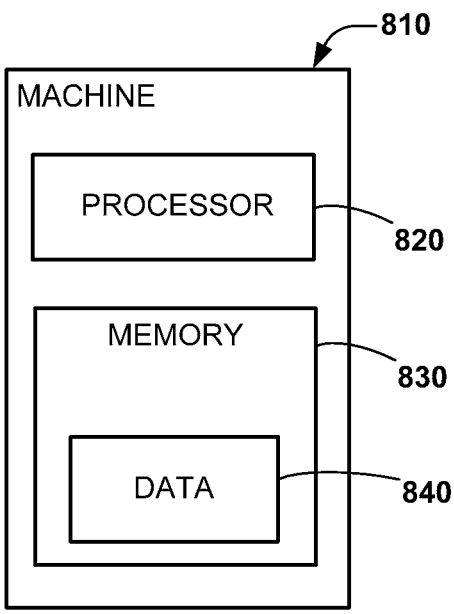
FIG. 8 is an illustration of a system in accordance with an embodiment of the present invention.

Reference is now made to FIG. 8, which illustrates a machine 810 including a processor 820 for applying one or more segmentation engines according to an embodiment of the present invention. The machine 810 is not limited to any particular type. Examples of the machine 810 include, without limitation, image capture devices (e.g., digital cameras, scanners, and all-in one devices), computers, and servers. In some embodiments, a machine according to the present invention can capture a digital image and process it. Examples include handheld devices such as handheld scanners, digital cameras, and PDA/phone cameras.

The processor 820 may be programmed by machine memory 830 encoded with data 840 for causing the processor 820 to process a digital image in accordance with an embodiment of the present invention. The data 840 may take the form of software or firmware, a web service, an applet, a standalone program, part of a larger program, or part of an operating system, to name but a few examples.

The invention claimed is:

1. An image processing method, comprising:
   applying a segmentation engine to different mappings of a digital image;
   generating primitives by tessellating non-congruent segments of the different mappings, where the primitives are defined by boundaries of the non-congruent segments in the different mappings; and
   classifying the primitives by:
      assessing, using a plurality of classifiers, a quality of each non-congruent segment of each mapping; and
      assigning a classification to each primitive based upon the assessing;
   wherein each of applying, generating and classifying is performed by a processor programmed by machine memory encoded with data.

2. The method of claim 1, wherein the different mappings address different image issues.

3. The method of claim 1, wherein at least one mapping is selected according to an image attribute.

4. The method of claim 1, wherein the different mappings include a first mapping of hue and a second mapping of saturation.

5. The method of claim 1, wherein classifications are assigned to the non-congruent segments of the different mappings, wherein the classifications of respective non-congruent segments used to define the primitives are compared, and wherein a classification of the respective non-congruent segment having a highest quality is assigned to a corresponding one of the primitives.

6. The method of claim 5, wherein the quality is based on a confidence level of classifying a segmented mapping.

7. The method of claim 6, wherein the quality is the confidence level weighted by statistics for the segmented mapping.

8. The method of claim 5, further comprising assigning emergent classifications to at least one of the primitives.

9. The method of claim 5, further comprising performing aggregation of the primitives.

10. The method of claim 9, wherein the aggregation is a function of precision of classification statistics.

11. The method of claim 9, wherein a zoning engine is applied, via the processor, to the different mappings to perform generation, classification, and aggregation of the primitives.

12. The method of claim 1, further comprising applying a second segmentation engine to the different mappings of the digital image.

13. A security method, comprising:
   performing the method of claim 1;
   extracting a segment classified as a deterrent; and
   authenticating the extracted segment.

14. An image processing method, comprising sending a digital image to an image processing pipeline that includes performing the method of claim 1.

* * * * *